United States Patent
Hassan et al.

(10) Patent No.: US 9,538,390 B2
(45) Date of Patent: Jan. 3, 2017

(54) WIRELESS CONNECTIVITY USING WHITE SPACES

(71) Applicant: Microsoft Technology Licensing, LLC, Redmond, WA (US)

(72) Inventors: Amer A. Hassan, Kirkland, WA (US); Paul W. Garnett, Albany, NY (US); Paul William Alexander Mitchell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/604,264

(22) Filed: Jan. 23, 2015

(65) Prior Publication Data

US 2016/0219439 A1    Jul. 28, 2016

(51) Int. Cl.
| | | |
|---|---|---|
| H04W 16/14 | (2009.01) | |
| H04W 4/02 | (2009.01) | |
| H04W 72/04 | (2009.01) | |
| G06F 3/0484 | (2013.01) | |
| H04W 64/00 | (2009.01) | |
| H04W 88/04 | (2009.01) | |

(52) U.S. Cl.
CPC .......... *H04W 16/14* (2013.01); *G06F 3/04842* (2013.01); *H04W 4/026* (2013.01); *H04W 4/027* (2013.01); *H04W 72/048* (2013.01); *H04W 64/006* (2013.01); *H04W 88/04* (2013.01)

(58) Field of Classification Search
CPC ............. H04W 52/0216; H04W 16/14; H04W 76/068; H04W 76/045; H04W 36/10; H04W 64/00; H04W 48/08; H04W 72/044; H04L 5/0055

USPC .......... 455/456.5, 454, 509, 426.1; 370/338, 370/480, 252
See application file for complete search history.

(56) References Cited

U.S. PATENT DOCUMENTS

| | | | |
|---|---|---|---|
| 8,254,481 | B1 | 8/2012 | Mccloskey et al. |
| 8,437,790 | B1 | 5/2013 | Hassan et al. |
| 8,473,989 | B2 | 6/2013 | Bahl et al. |
| 8,483,155 | B1 | 7/2013 | Banerjea et al. |
| 8,611,924 | B2 | 12/2013 | Shu |
| 8,725,169 | B2 | 5/2014 | Xiao et al. |
| 2012/0231826 | A1 | 9/2012 | Koorapaty et al. |

(Continued)

FOREIGN PATENT DOCUMENTS

EP    3817US01    11/2014

OTHER PUBLICATIONS

"GPS Long Backoff if no Accelerometer Movement", retrieved from http://www.greenalp.com/forum/viewtopic.php?f=8&t=298 on Aug. 12, 2014, 7 pages.

(Continued)

*Primary Examiner* — Phuoc H Doan
(74) *Attorney, Agent, or Firm* — Tom Wong; Monica Adjemian; Micky Minhas

(57) ABSTRACT

Techniques for wireless connectivity using white spaces (e.g., television (TV) white spaces) are described. In at least some embodiments, movement of a device operating as a white space access point is monitored by local sensors within the device. Movement data that is gathered by the local sensors is used to determine an upper bound of distance travelled. When the upper bound reaches a threshold distance, various actions can be performed relating to the data transmission, such as to cease transmission or to utilize different portions of the radio spectrum.

20 Claims, 13 Drawing Sheets

(56) References Cited

U.S. PATENT DOCUMENTS

| | | |
|---|---|---|
| 2012/0238304 A1 | 9/2012 | Lambert et al. |
| 2013/0337857 A1 | 12/2013 | Hassan et al. |
| 2014/0003282 A1 | 1/2014 | Kafle et al. |
| 2014/0038655 A1 | 2/2014 | Garnett et al. |
| 2014/0079043 A1* | 3/2014 | Montemurro ..... H04W 52/0216 370/338 |
| 2014/0148190 A1 | 5/2014 | Lancaster et al. |
| 2014/0301242 A1 | 10/2014 | Hassan et al. |

OTHER PUBLICATIONS

"Location APIs", retrieved from https://developer.android.com/google/play-services/location.html on Aug. 12, 2014, 2 pages.

"Spectrum Technology", retrieved from http://research.microsoft.com/en-us/projects/spectrum/technology.aspx, Jul. 27, 2013, 2 pages.

Jia,"Smart Power Management for Mobile GPS using Xtrinsic MMA8452Q", retrieved from http://cache.freescale.com/files/sensors/doc/app_note/AN4601.pdf on Sep. 12, 2014, 7 pages.

Malkos,"Shaping the Future of Mems and Sensors", retrieved from http://www.st.com/st-web-ui/static/active/en/resource/sales_and_marketing/presentation/product_presentation/MEMS_Summit_Steve_Malkos.pdf, Sep. 10, 2013, 23 pages.

Murty,"SenseLess: A Database Drive White Spaces Network", n Journal of IEEE Transactions on Mobile Computing, Sep. 20, 2010, 21 pages.

Saeed,"Towards Dynamic Real-Time Geo-location Databases for TV White Spaces", n Proceedings of Computing Research Repository, Mar. 2013, 8 pages.

Widhalm,"Discovering Urban Activity Patterns in Cell Phone Data", retrieved from http://humnetlab.mit.edu/wordpress/wp-content/uploads/2010/10/TransportationWidhalmDiscovering.pdf on Nov. 11, 2014, 27 pages.

"International Search Report and Written Opinion", Application No. PCT/US2016/014410, Apr. 15, 2016, 13 pages.

* cited by examiner

WIRELESS CONNECTIVITY USING WHITE SPACES

BACKGROUND

Many devices today utilize some form of wireless radio frequency (RF) data communication. Examples of RF communication include wide area cellular networks (e.g., for mobile services), local area network access (e.g., WiFi® connectivity), broadcast television, global positioning system (GPS) navigation, and so forth. Typically, different forms of RF communication use different portions of the radio spectrum. While many portions of the radio spectrum are allocated and/or licensed (or assigned) for particular uses, there remain portions that are underutilized. Such underutilized portions of the radio spectrum may be leveraged for various forms of RF communication on an unlicensed basis, such as those listed above. Any use of such underutilized portions, however, must avoid interference with existing licensed RF communications and must comply with regulatory requirements for RF communication. The United States Federal Communication Commission (FCC) currently requires that portable devices transmitting on white space frequencies in the United States must have a known location to within 50 meters.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for wireless connectivity using white spaces are described. In at least some embodiments, movement of a device operating as a white space access point is monitored by local sensors within the device. Movement data that is gathered by the local sensors is used to determine an upper bound of distance travelled. When the upper bound reaches a threshold distance, various actions can be performed relating to the data transmission, such as to cease transmission or to utilize different portions of the radio spectrum.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
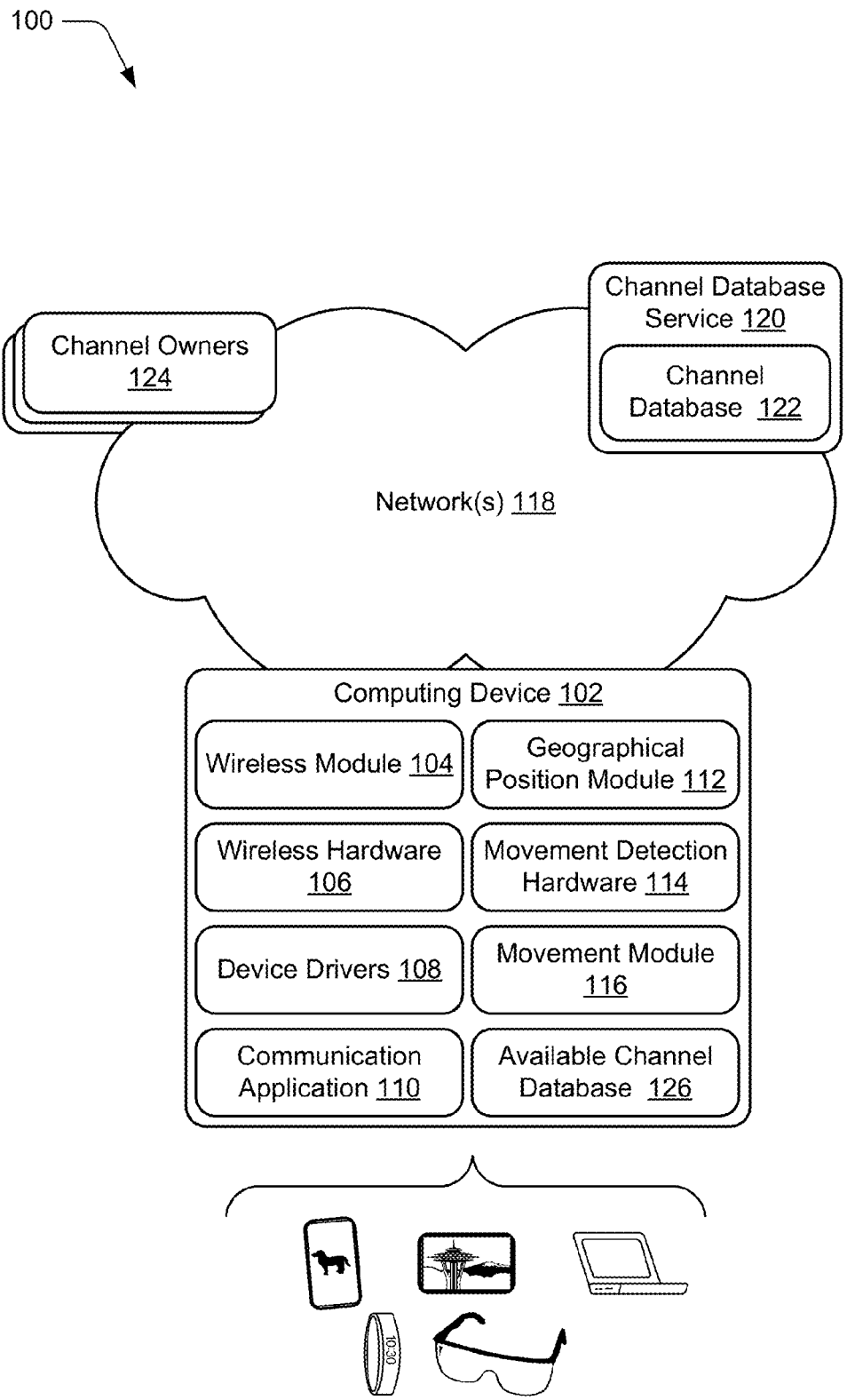
FIG. 1 is an illustration of an environment in an example implementation that is operable to employ techniques discussed herein in accordance with one or more embodiments.

Techniques for wireless connectivity using white spaces are described. According to various implementations, local sensors on a wireless device are used to maintain regulatory compliance by performing actions responsive to detecting local movement of the wireless device while utilizing white spaces in the radio spectrum (e.g., television (TV) white spaces) for data transmission. In at least some implementations, a set of channels is selected for wireless communication. The set of channels may be selected from various portions of the RF spectrum, such as unassigned portions of the RF spectrum (e.g., TV white spaces), guard bands between licensed portions of the RF spectrum, RF spectrum allocated for access on an unlicensed basis, unused or underutilized portions of licensed RF spectrum, and so forth.

According to various implementations, movement of a wireless device that is using a set of wireless channels is detected utilizing local sensors that collect movement-related data. Utilizing the movement-related data, it is determined whether the wireless device has moved a threshold distance from a starting location. Movement may be measured according to various degrees of accuracy, and may or may not include directional information. According to various implementations, upon reaching the threshold distance, the wireless device performs an action in relation to the wireless communication. Examples of such action include presenting a notification that the threshold distance is reached, ceasing use of the set of wireless channels for wireless communication, validating that the set of wireless channels may continue to be used, seeking a new set of wireless channels, switching a method for wireless communication, and so forth.

In at least some implementations, the threshold distance is related to a regulatory requirement for location awareness. For instance, a regulatory requirement for utilizing a set of wireless channels may specify that in order for a wireless device to be permitted to utilize the set of wireless channels, the wireless device is to know its geographic location to within a threshold distance, e.g., n meters. Thus, if the wireless device moves more than the threshold distance from a previous known geographic location without updating its location awareness, the wireless device may ascertain that an action in relation to the set of wireless channels is to be performed, such as to validate that the device is still permitted to utilize the set of wireless channels. Such a scenario may occur when a wireless device is in a location where geographic position information is not available, such as inside a structure.

According to various implementations, position determination functionality of a wireless device (e.g., Global Positioning System (GPS) functionality) is maintained in an inactive state, e.g., powered-off. When movement of the wireless device a threshold distance is detected, the position determination functionality is activated (e.g., powered-on) to ascertain a location of the wireless device. In an event that the location of the wireless device is a threshold distance from a previous location, an action in relation to wireless communication is performed, examples of which are detailed throughout this disclosure.

Thus, implementations provide ways of performing actions responsive to detecting local movement of non-stationary wireless devices (e.g., wireless access points) utilizing white spaces in the radio spectrum for data transmission. Such implementations may allow for a non-stationary or mobile device to operate as a white space access point while maintaining regulatory compliance. Further, power consumption may be decreased as local sensors are used to determine movement, thus eliminating the need to maintain external connections with remote sensors and/or systems. Power consumption may further be decreased by maintaining certain position determination functionality in an inactive state until certain distance-related events occur. Still further, such implementations may operate when no remote sensors and/or systems are available to determine location or movement. Thus, non-stationary or mobile devices may act as a white space access point while retaining regulatory compliance in a variety of situations.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Following this, a section entitled "Example Procedures" describes some example procedures for using local sensors to maintain a whitespace access point in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for wireless connectivity using white spaces described herein. The environment 100 includes computing device 102 which can be embodied as any suitable device such as, by way of example and not limitation, a smartphone, a tablet computer, a portable computer (e.g., a laptop), a wearable device, a desktop computer, and so forth. One of a variety of different examples of the computing device 102 is shown and described below in FIG. 16.

The computing device 102 of FIG. 1 is illustrated as including wireless module 104, which is representative of functionality to enable the computing device 102 to communicate wirelessly with other devices and/or entities. The wireless module 104 can be configured to enable data communication via a variety of different wireless techniques and protocols. Examples of such techniques and/or protocols include mobile cellular communications (e.g., 3G, 4G, Long Term Evolution (LTE), and so forth), near field communication (NFC), short-range wireless connections (e.g., Bluetooth), local area wireless networks (e.g., one or more standards in compliance with IEEE 802.11), wide area fixed wireless networks (e.g., one or more standard in compliance with IEEE 802.16), wireless telephone networks, and so on. For instance, the wireless module 104 is configured to perform various aspects of techniques for using local sensors to maintain a whitespace access point discussed herein.

The computing device 102 further includes wireless hardware 106, which is representative of various hardware components that can be employed to enable the computing device 102 to communicate wirelessly. Examples of the wireless hardware 106 include radio transmitters, radio receivers, various types and/or combinations of antennas, impedance matching functionality, and so on. In at least some implementations, the computing device 102 is a multi-radio device that can communicate via different wireless technologies and/or protocols.

Further included as part of the computing device 102 are one or more device drivers 108, which are representative of functionality to enable the computing device 102 to interact with various devices, and vice-versa. For instance, the device drivers 108 can enable interaction between various functionalities of the computing device 102 (e.g., an operating system, applications, services, and so on) and different devices of the computing device 102, such as input/output (I/O) devices. The device drivers 108, for instance, can enable interaction between the wireless module 104 and the wireless hardware 106 to enable the computing device 102 to transmit and receive wireless signals.

In at least some implementations, the computing device 102 is configured to communicate with other devices and/or entities via a communication application 110. Generally, the communication application 110 is representative of functionality to enable different forms of communication via the computing device 102. Examples of the communication application 110 include a voice communication application (e.g., a Voice over Internet Protocol (VoIP) client), a video communication application, a messaging application, a content sharing application, and combinations thereof. The communication application 110, for instance, enables different communication modalities to be combined to provide diverse communication scenarios.

The computing device 102 further includes geographical position module 112, which is representative of functionality to enable the computing device 102 to determine a geographical position of the device. The geographical position module 112 can be configured to enable determination of a geographical location of the computing device 102 via a variety of different techniques utilizing external sources. Examples of such techniques include utilizing space-based satellite navigation systems such as the Global Position System (GPS) including potential variants such as assisted GPS or differential GPS, the Global Navigation Satellite System (GLONASS), the BeiDou (or Compass) navigation system, and/or the Galileo positioning system. Examples of such techniques further include utilizing cellular communication systems, broadband wireless (e.g., WiFi™) networks, or radio frequency identifier (RFID) functionality, such as for trilateration or multilateration relative to a plurality of different wireless base stations or access points having known locations, and/or a technique based on detecting signal strength relative to a known base station or access point, combinations thereof, and so forth. Examples of geographical location information may include GPS coordinates, network location, location with reference to a cell tower and/or set of cell towers, a street address, an enterprise-based location (e.g., a building name and/or number, an office number, and so forth), and so on.

Further included as part of the computing device 102 is movement detection hardware 114, which is representative of various hardware components that can be employed to enable the computing device 102 to detect movement of the device. In one or more implementations, the movement detection hardware 114 may include one or more accelerometer components (also referred to simply as accelerometers). An accelerometer provides an indication of a direction of movement (e.g., in two or three dimensions) and a distance (or amount) of movement. The direction can be specified in different manners, such as an angle (e.g., a particular number of degrees) from an origin, a compass direction, and so forth. The distance can also be specified in different manners, such as in meters and/or fractions thereof, feet, and so forth.

Alternatively or additionally, the movement detection hardware 114 may include various MEMS (Microelectromechanical Systems or Microelectronicmechanical systems) sensors such as a compass, a gyroscope, a barometric altimeter, and so forth. The movement detection hardware 114 may be able to determine distance and/or direction of movement based on the various MEMS and/or other components.

Further included as part of the computing device 102 is movement module 116, which is representative of functionality to determine and track movement of the computing device 102. According to implementations discussed herein, the movement module 116 can determine movement of the computing device 102 in various ways, such as at regular intervals (e.g., every n milliseconds (ms), at irregular intervals, at a same frequency as content displayed on the computing device 102 is updated (e.g., at a display refresh rate used by the computing device 102), in response to an event, in response to input from another component or module, and so forth.

Additionally or alternatively, the movement module 116 can include and/or receive input (e.g., movement-related data) from one or more other components or modules (e.g., the movement detection hardware 114 of the computing device 102) to determine the movement of the computing device 102. In at least some implementations, the movement module 116 may estimate a number of steps taken based on input received from the movement detection hardware 114. The estimated number of steps taken may be multiplied by an estimated average distance per step to determine a distance travelled.

Alternatively or additionally, the movement module 116 can receive data from one or more other components and analyze the received data to determine the direction and/or distance of movement of the computing device 102. For example, the movement module 116 can receive data that is captured images from a camera or other image capture device. The movement module 116 can determine based on the captured images (e.g., by tracking object locations in the images) a direction and/or distance of movement of the computing device 102. Input received by the movement module 116 can include various other types of input, such as portions of captured images, data identifying objects in captured images, and so forth.

In one or more implementations, the movement module 116 determines a device movement vector that indicates a distance and direction of movement of the computing device 102. The device movement vector can have any number of dimensions, such as two dimensions (e.g., in the x and y dimensions of a plane of the computing device 102), three dimensions (e.g., in the x and y dimensions of a plane of the computing device 102, and in a z dimension approximately perpendicular to the plane that includes the x and y dimensions,) and so forth. A plane of the computing device 102, for instance, refers to a plane approximately parallel to a display surface of the computing device 102 (e.g., a screen on which content is displayed). The movement module 116 can provide the device movement vector to other components in various manners, such as providing the device movement vector as a parameter of a procedure, function, application programming interface (API), etc., by storing the device movement vector in a location accessible to other components, and so forth.

The environment 100 further includes a network 118, which is representative of a single network or a combination of different interconnected networks. In at least some implementations, the network 118 represents different portions of the radio spectrum that may be leveraged for wireless communication. The network 118, for instance, represents radio spectrum in different frequency bands, such as ultra-high frequency (UHF), super-high frequency (SHF), and so forth. The network 118 may also represent a combination of wireless and wired networks and may be configured in a variety of ways, such as a wide area network (WAN), a local area network (LAN), the Internet, and so forth. According to various implementations, the wireless module 104 is configured to enable the computing device 102 to act as a wireless access point for other devices to access the network 118.

The environment 100 further includes channel database service 120, which is representative of functionality to track and/or manage various attributes of wireless channels, e.g., white spaces. The channel database service 120, for instance, can track channel utilization for different wireless channels, e.g., whether a particular wireless channel is in use and/or is available to be used for wireless communication, level of channel usage for different channels, and so forth. The channel database service 120 may track and monitor various other attributes of wireless channels, such as channel quality, signal-to-noise ratios for different channels, noise floor in particular channels, and so forth. For example, the channel database service 120 maintains channel database 122 which stores status information for different wireless channels. As further detailed below, the channel database service 120 may provide channel information from the channel database 122 to different entities (e.g., the computing device 102) to enable wireless channels to be selected for wireless communication.

In at least some implementations, the channel database service 120 receives information regarding wireless channels from channel owners 124. Generally, the channel owners 124 are representative of different entities that have certain rights and/or privileges to different portions of the radio spectrum. For instance, the channel owners 124 may represent licensees of certain portions of the radio spectrum in a particular market and/or markets, such as television networks, cellular carriers, radio stations, and so forth. The channel owners 124 may also represent entities that are granted exclusive or shared access to particular frequency bands, such as government organizations, emergency services, academic and/or research entities, and so forth. Generally, licenses and privileges for access to different portions of the radio spectrum are regulated by government organizations, such as the Federal Communications Commission (FCC) in the United States, the Office of Communications (OFCOM) in the United Kingdom, and so forth.

Wireless channels tracked by the channel database 122 may occur in various regions of the RF spectrum, such as regions associated with broadcast television, cellular communications, satellite communications, short-range wireless communications, and so forth.

As further illustrated in the environment 100, the computing device 102 includes available channel database 126, which is representative of a database of wireless channels that are available for wireless communication in the network 118. The available channel database 126, for instance, can be populated with channel information received from the channel database service 122. The channel information received from the channel database service 122, and therefore the available channel database 126, may be based at least in part on the location of the computing device 102. In at least some implementations, available channel information from the available channel database 126 can be utilized by the computing device 102 to enable a channel and/or channels to be selected for wireless communication. Further details concerning identification and selection of wireless channels are presented below.

According to implementations discussed herein, techniques can be employed to establish wireless data communication between the computing device 102 and other devices utilizing a variety of different wireless data communication techniques and/or protocols. For instance, channels that are identified in the available channel database 126 may be leveraged for wireless communication via various wireless standards, such as cellular communications (e.g. 3G, 4G, Long Term Evolution (LTE), and so forth), near field communication (NFC), short-range wireless connections (e.g., Bluetooth), local area wireless networks (e.g., one or more standards in compliance with IEEE 802.11), wide area wireless networks (e.g., one or more standard in compliance with IEEE 802.16 or 802.22), wireless telephone networks, satellite communications, and so on. This is not intended to be limiting, however, and a wide variety of different wireless techniques and protocols may be utilized in accordance with the disclosed implementations.

Having described an example environment in which the techniques described herein may operate, consider now a discussion of some example implementation scenarios in accordance with one or more implementations.

Example Implementation Scenarios

The following discussion describes example implementation scenarios for wireless connectivity using white spaces in accordance with one or more implementations. In portions of the following discussion, reference will be made to the environment 100 of FIG. 1.

Figure 2:
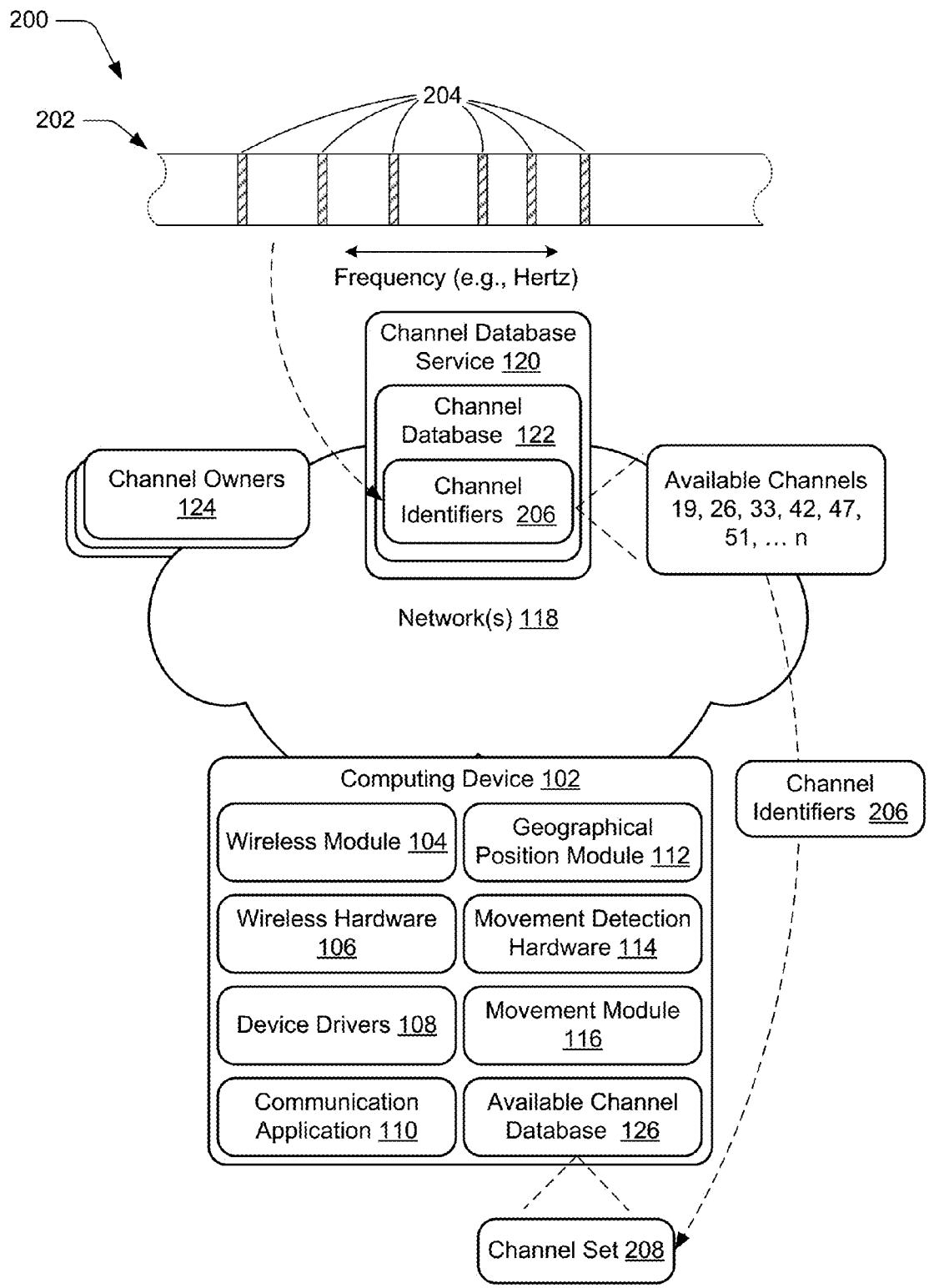
FIG. 2 illustrates an example implementation scenario for determining available wireless channels in accordance with one or more embodiments.

FIG. 2 illustrates an example implementation scenario 200 for determining available wireless channels in accordance with one or more implementations.

In the scenario 200, the channel database service 120 determines that spectrum portion 202 of the radio spectrum includes a set of available channels 204. Generally, the available channels 204 correspond to channels (e.g., white spaces, guard bands, and so forth) that are available for wireless communication in a geographical region of the computing device 102.

The channel database service 120 may determine the available channels 204 in a variety of different ways. For instance, the channel owners 124 for individual of the respective available channels 204 may notify the channel database service 120 of the available channels 204. Alternatively or additionally, the channel database service 120 may query the channel owners 124 as to whether their respective channels are being utilized. As yet another example, the channel database service 120 may detect that the available channels are not being leveraged for signal communication, e.g., for a licensed use.

As an example implementation, consider that the available channels 204 include "white spaces" in the spectrum portion 202 of the radio spectrum. The available channels 204, for instance, may be licensed to particular channel owners 124 and/or allocated for particular uses. The available channels 204, however, are not currently in use. For example, the available channels 204 correspond to discrete wireless channels that are licensed to particular channel owners 124 but are not being utilized for their licensed purpose. In at least some implementations, the channel owners 124 for the respective available channels 204 may notify the channel database service 120 as such.

As an addition or alternative to white spaces, the available channels 204 may include various other types of channels and/or regions of the RF spectrum, such as guard bands between licensed portions, licensed channels, and so forth. Thus, the available channels 204 generally correspond to wireless channels that are available for wireless communication in a particular geographical region.

Further to the scenario 200, the channel database service 120 stores channel identifiers 206 for the available channels 204 as part of the channel database 122. According to various implementations, the channel database 122 stores channel identifiers for various wireless channels that are available in different geographical regions.

The channel database service 120 then communicates the channel identifiers 206 to the computing device 102, which stores the channel identifiers 206 as part of the available channel database 126. According to various implementations, the channel database service 120 may communicate channel identifiers for available wireless channels to the computing device 102 periodically, such as according to a pre-specified time period. Alternatively or additionally, the channel database service 120 may communicate channel identifiers to the computing device 102 in response to various events, such as a query from the computing device 102 for available channels.

Further to the scenario 200, the computing device 102 selects a channel set 208 that includes one or more channels of the channel identifiers 206. The channel set 208, for instance, corresponds to a subset of the available channels 204 and is selected based on one or more criteria, such as a bandwidth requirement of the computing device 102. Generally, the channel set 208 is selected from the available channel database 126 and includes the channel identifiers 206 for individual channels of the channel set 208. The channel set 208 may identify available channels in various ways, such as with reference to frequency ranges for the individual channels, channel numbers for the channels (e.g., assigned based on a regional band plan), and so forth.

According to various implementations, individual channels of the channel set 208 may include allowed transmission power levels. A maximum transmission power, for instance, may be specified for individual channels to mitigate interference with communication in adjacent channels, such as licensed uses of channels that are in proximity to the available channels 204.

In at least some implementations, the computing device 102 (e.g., via the wireless module 104) can query the channel database service 120 for available channels on a periodic basis (e.g., every 24 hours) and/or in response to various events, such as detecting that the computing device 102 has moved a threshold distance. The computing device 102 stores the channel set 208 and may utilize one or more channels identified in the channel set 208 to initiate and/or participate in wireless data communication according to techniques for using local sensors to maintain a whitespace access point discussed herein.

Generally, the scenarios discussed below represent scenarios in which the computing device 102 is utilizing a set of wireless channels for wireless communication, such as for serving as a wireless access point for one or more other devices. The scenarios are further discussed with reference to a "threshold distance," which generally represents a distance of movement after which an action in relation to the set of wireless channels is to occur.

Figure 3A:
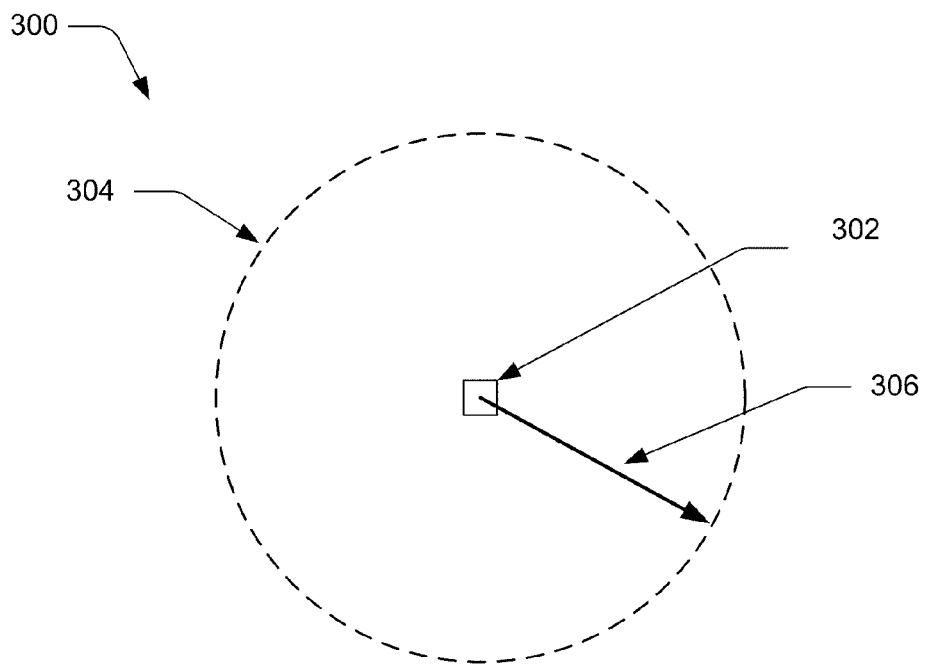
FIGS. 3A and 3B illustrate example implementation scenarios for detecting, based on movement data, that a device has moved a threshold distance in accordance with one or more embodiments.
Figure 3B:
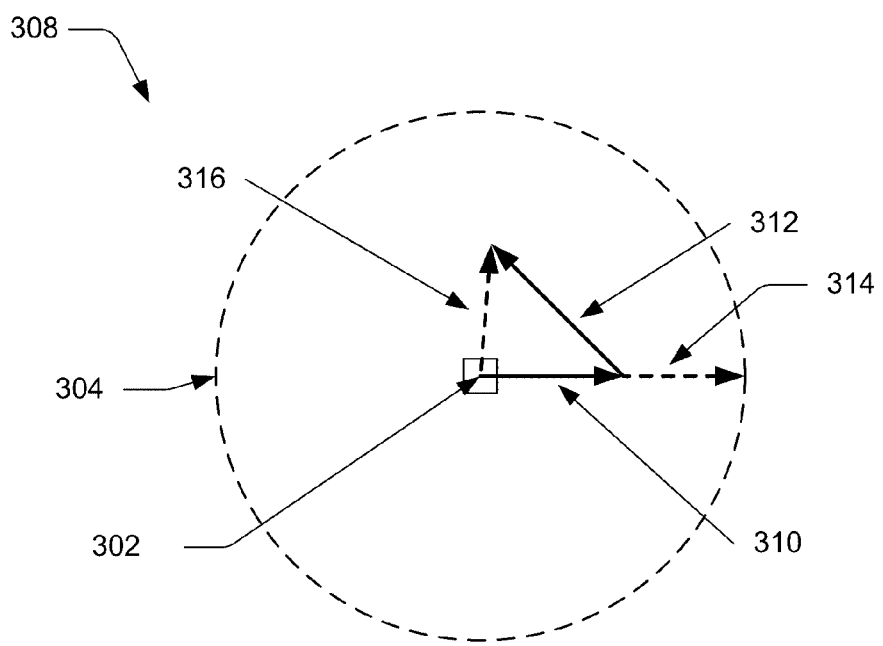

FIGS. 3A and 3B illustrate example implementation scenarios 300 and 308, respectively, for detecting based on movement data that a device has moved a threshold distance in accordance with one or more implementations. According to various implementations, the scenarios 300 and/or 308 represent a continuation and/or extension of the scenario 200.

The scenario 300 includes the computing device 102 introduced above, and further indicates an origin location 302 that represents a starting location of the computing device 102, and a threshold distance 304 from the origin location 302. The origin location 302 may be an unknown, arbitrary location, or may be a known location such as a location determined by the geographical position module 112. The threshold distance 304 may be, for example, 50 meters, n meters, or any other specified distance. The movement module 116 receives movement information from the movement detection hardware 114 describing movement 306 of the computing device 102. The movement information may be determined in various ways, examples of which are detailed below. In this scenario, the movement module 116 determines that the movement 306 is of a distance equal to or greater than the threshold distance 304 away from the origin location 302. Based on the determination, the computing device 102 performs one or more actions in relation to wireless connectivity. Example actions in relation to wireless connectivity are discussed below.

The scenario 308 of FIG. 3B includes the computing device 102 introduced above, and the threshold distance 304 as introduced above with reference to FIG. 3A. The movement module 116 receives movement information from the movement detection hardware 114 representing movements 310 and 312 of the computing device 102 from the origin location 302. In the scenario 308, the movement 310 includes movement in a first direction and the movement 312 includes movement in a second direction. In the scenario 308, movement information does not include direction information and includes only distance information, represented as movement upper bound 314. Generally, the movement upper bound 314 represents an estimated distance of movement that is estimated based only on movement of the computing device 102, and does not incorporate direction of movement. As illustrated, the movement upper bound 314 is at least equal to the threshold distance 304, even though device movement vector 316 does not meet or exceed the threshold distance 304. Generally, the device movement vector 316 represents an actual distance of the computing device 102 from the origin location 302 after the movements 310 and 312. In this particular scenario, however, movement of the computing device 102 is determined based on total accumulated movement and not on direction of movement, and thus movement of the computing device 102 is determined to be the movement upper bound 314. Based on the movement upper bound 314, the computing device 102 performs one or more actions in relation to wireless connectivity. Example actions in relation to wireless connectivity are discussed below.

Figure 4A:
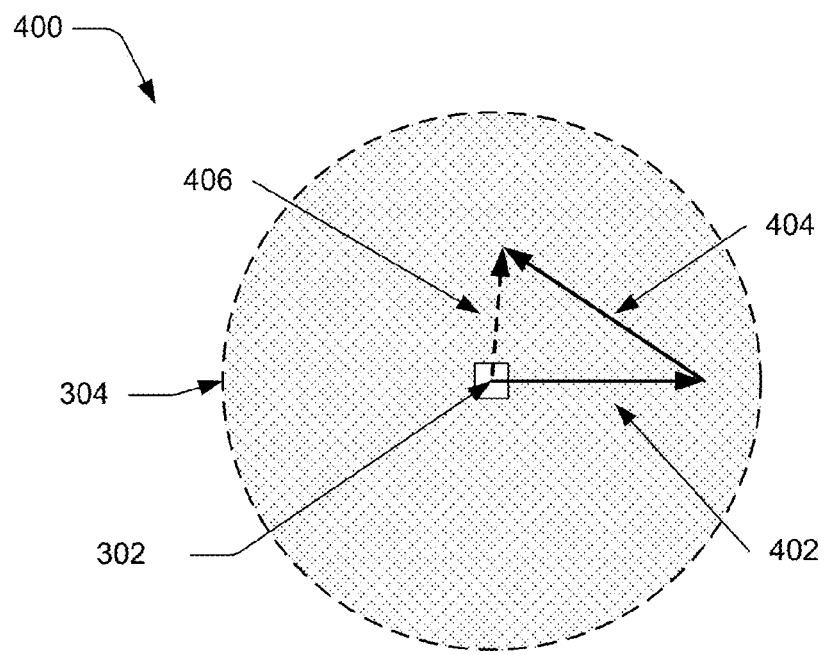
FIGS. 4A and 4B illustrate example implementation scenarios for detecting, based on movement data, that a device has moved a threshold distance in accordance with one or more embodiments.
Figure 4B:
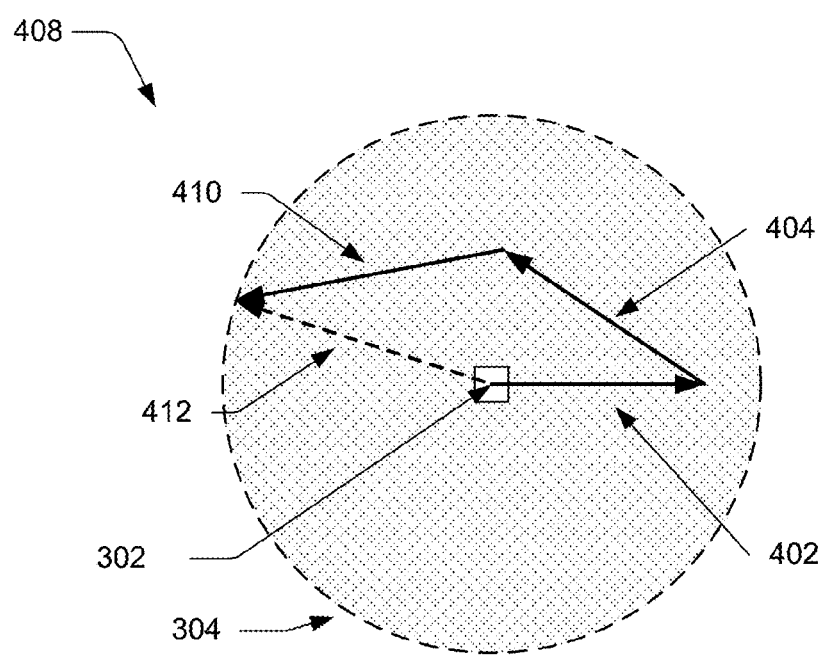

FIGS. 4A and 4B illustrate example implementation scenarios 400 and 408, respectively, for detecting based on movement data that a device has moved a threshold distance in accordance with one or more implementations. According to various implementations, the scenarios 400 and/or 408 represent a continuation and/or extension of the scenario 200.

The scenario 400 in FIG. 4A includes the computing device 102 introduced above and the threshold distance 304 as introduced above with reference to FIG. 3A. The movement module 116 receives movement information from the movement detection hardware 114 representing movements 402, 404 of the computing device 102 from the origin location 302. In this scenario, the movement 402 represents movement in a first direction and the movement 404 represents movement in a second direction. Generally, movement information in the scenario 400 includes both distance information and direction information and is represented as device movement vector 406. The device movement vector 406 is a vector representing a total estimated movement of the computing device 102 from the origin location 302 through the movements 402 and 404. In at least some implementations, a movement upper bound may be estimated to be equal to the device movement vector 406. Alternatively, the movement upper bound may be estimated to be greater than the device movement vector 406. For example, the movement upper bound may include the device movement vector 406 and an additional error or safety value. In this scenario, although the combined distance of the movement 402 and the movement 404 exceeds the threshold distance 304, the device movement vector 406 and the movement upper bound do not exceed the threshold distance 304. As the movement upper bound does not exceed the threshold distance 304, the computing device 102 is not required to perform an action in relation to wireless connectivity. The computing device 102, for instance, determines that it is still within a threshold distance from its last known location, e.g., the origin location 302.

The scenario 408 in FIG. 4B is a continuation of the scenario 400. In this scenario, there is additionally movement 410. Accordingly, device movement vector 412 is determined which is a vector representing the net movement of the computing device 102 through the movements 402, 404, and 410. As illustrated, the device movement vector 412 at least meets or exceeds the threshold distance 304. In at least some implementations, a movement upper bound for the computing device 102 may be equal to the device movement vector 406. Alternatively, the movement upper bound may be greater than the device movement vector 406. For example, the movement upper bound may include the device movement vector 406 with an additional error or safety value added. Based on the movement upper bound meeting or exceeding the threshold distance 304, the computing device 102 performs one or more actions in relation to wireless connectivity. Example actions in relation to wireless connectivity are discussed below.

Figure 5:
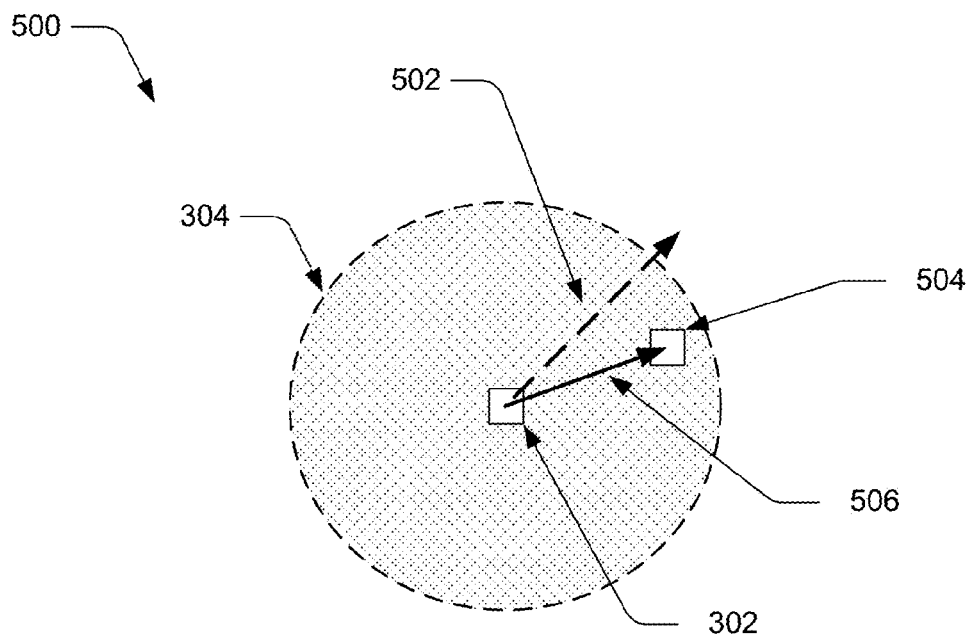
FIG. 5 illustrates an example implementation scenario for performing an action in response to a computing device having moved a threshold distance in accordance with one or more embodiments.

FIG. 5 illustrates example implementation scenario 500 for performing an action in response to the computing device 102 having moved a threshold distance in accordance with one or more implementations. According to various implementations, the scenario 500 represents a continuation and/or extension of the scenarios 200, 300, 308, and/or 408.

The scenario 500 includes the computing device 102 and the threshold distance 304 as introduced above with reference to FIG. 3A. The movement module 116 receives movement information from the movement detection hardware 114 representing movements of the computing device 102. Utilizing the movement information, the movement module 116 estimates a movement upper bound 502.

In this scenario, movement upper bound 502 exceeds the threshold distance 304. In response to movement upper bound 502 exceeding the threshold distance 304, the computing device 102 activates a location detection functionality such as the geographical position module 112 to receive location data from a remote source. For instance, until it is determined that the movement of the computing device 102 meets or exceeds the threshold distance 304, the geographical position module 112 is maintained in an inactive state. The location detection functionality may establish the location of the computing device 102 to be within the threshold distance 304, such as at location 504. The computing device 102 may determine based on the location 504 that its actual movement is movement 506. For instance, movement data used to estimate the movement upper bound 502 may have overestimated the actual distance from the origin location 302. Upon determining the movement 506, the computing device 102 may update the movement upper bound 502 to match the movement 506, and continue monitoring movement as described above.

In an alternative scenario, the location detection functionality may establish the location of the computing device 102 to be beyond the threshold distance 304. In such a scenario, the computing device 102 then proceeds to perform one or more actions in relation to wireless connectivity. Example actions in relation to wireless connectivity are discussed throughout this disclosure.

Figure 6:
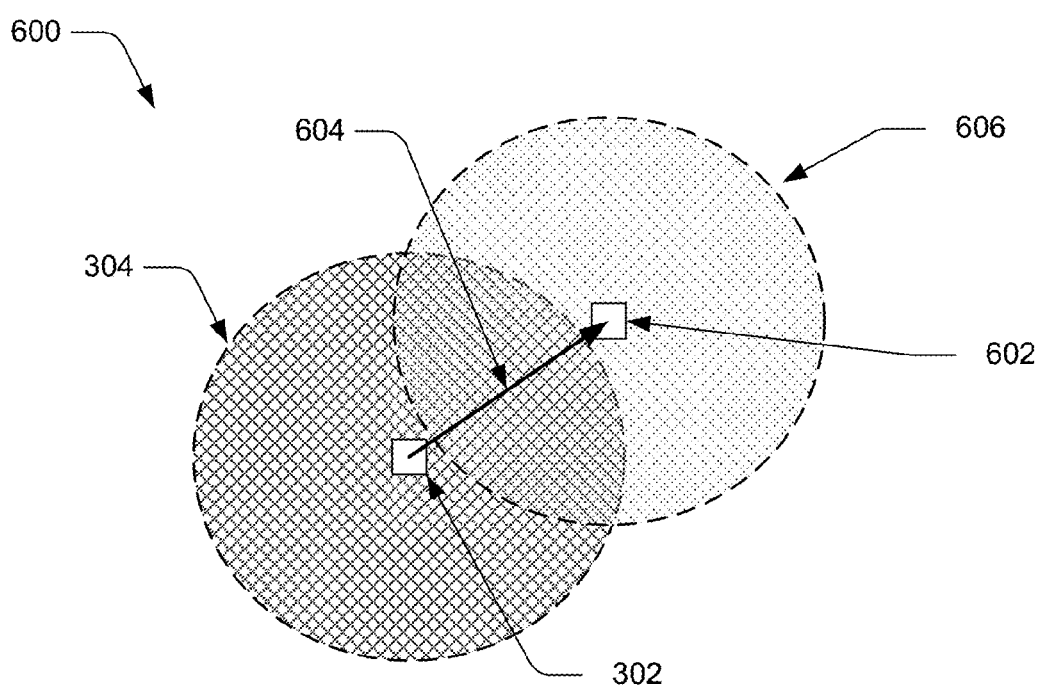
FIG. 6 illustrates an example implementation scenario for performing an action in relation to wireless connectivity in response to a computing device having moved a threshold distance in accordance with one or more embodiments.

FIG. 6 illustrates example implementation scenario 600 for performing an action in relation to wireless connectivity after a device has moved a threshold distance in accordance with one or more implementations. According to various implementations, the scenario 600 represents a continuation and/or extension of the scenarios 200, 300, 308, 408 and/or 500.

The scenario 600 in FIG. 6 includes the computing device 102 and the threshold distance 304 as introduced above with reference to FIG. 3A. The movement module 116 receives movement information from the movement detection hardware 114 representing the movements of the computing device 102 from the origin location 302. In this scenario, the computing device 102 moves to a new location 602. The movement to the new location 602 is represented by movement upper bound 604 that exceeds the threshold distance 304. As illustrated, the computing device 102 has moved beyond the threshold distance 304. In implementations, the computing device 102 may notify a user that the movement upper bound 604 has exceeded the threshold distance 304.

According to various implementations, the computing device 102 performs one or more actions in relation to wireless connectivity in response to the movement upper bound 604 exceeding the threshold distance 304. In this scenario, the computing device 102 ceases utilizing the channel set 208 associated with the origin location 302 and the threshold distance 304. For instance, the wireless module 104 determines that based on the computing device 102 exceeding the threshold distance 304, the channel set 208 is stale and is to be refreshed. Accordingly, the wireless module 104 queries the channel database service 120 for available channels, and begins utilizing a new channel set associated with the new location 602. The new location 602 is associated with threshold distance 606. In at least some implementations, the query may involve activating a location detection functionality such as the geographical position module 112 to receive location data from a remote source. Alternatively or additionally, the computing device 102 may cease utilizing the channel set 208 and may present a notification and/or query a user for further action.

FIGS. 7-10 illustrate example user interfaces that may be displayed by the computing device 102, in accordance with one or more implementations.

Figure 7:
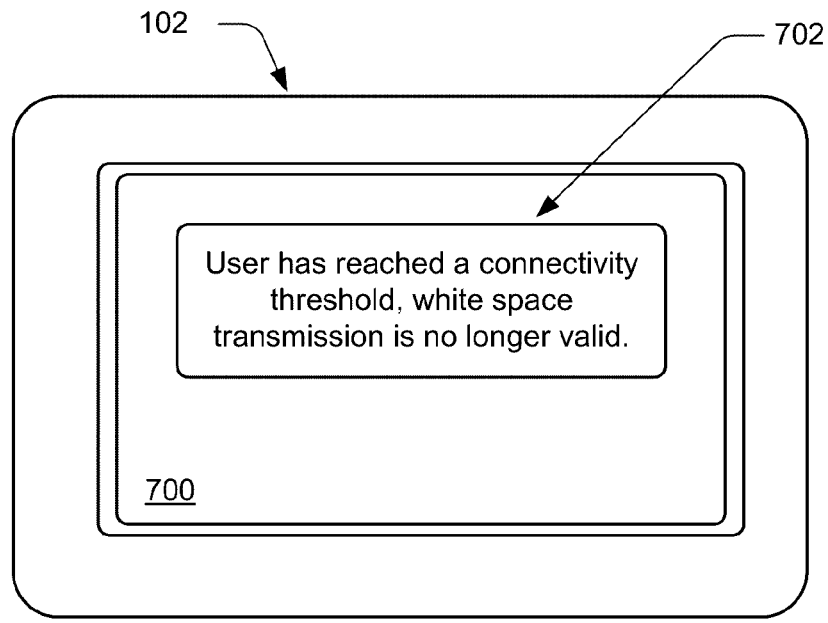
FIG. 7 illustrates an example graphical user interface that may be displayed by a computing device in accordance with one or more embodiments.

FIG. 7 illustrates graphical user interface (GUI) 700 displaying message 702. In this particular example, the message 702 includes the message "User has reached a connectivity threshold, white space transmission is no longer valid." The GUI 700, for instance, is presented in response to the movement module 116 estimating that a movement upper bound for the computing device 102 meets or exceeds a threshold distance from an origin location.

Figure 8:
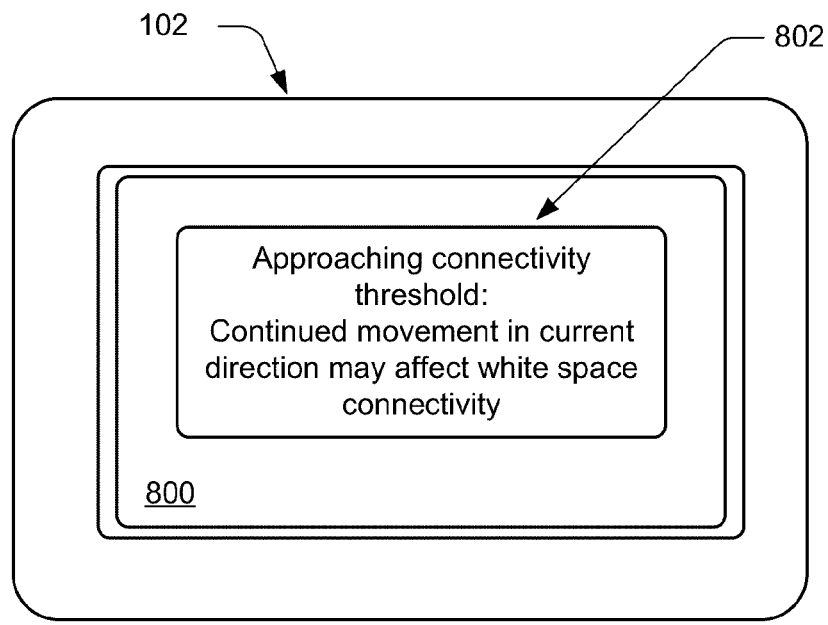
FIG. 8 illustrates an example graphical user interface that may be displayed by a computing device in accordance with one or more embodiments.

FIG. 8 illustrates GUI 800 displaying message 802. In this particular example, the message 802 includes the message "Approaching connectivity threshold: Continued movement in current direction may affect white space connectivity." The GUI 800, for instance, is presented in response to the movement module 116 estimating that a movement upper bound for the computing device 102 is nearing a threshold distance from an origin location. Such a message may allow a user to alter their movement such that they remain within the threshold distance from the origin location.

Figure 9:
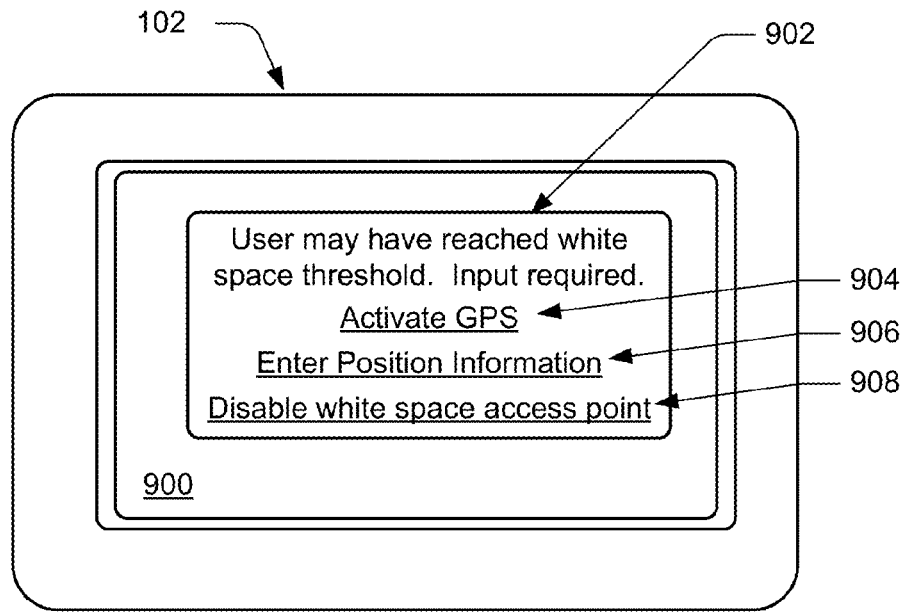
FIG. 9 illustrates an example graphical user interface that may be displayed by a computing device in accordance with one or more embodiments.

FIG. 9 illustrates GUI 900 displaying message 902. In this particular example, the message 902 includes the message "User may have reached white space threshold. Input required" and includes selectable user input options 904 "Activate GPS," 906 "Enter position information" and 908 "Disable white space access point." The GUI 900, for instance, is presented in response to the movement module 116 estimating that a movement upper bound for the computing device 102 meets or exceeds a threshold distance from an origin location. The user input option 904 "Activate GPS" is selectable to allow a user to activate a space-based satellite navigation system (e.g. GPS) functionality to determine the location of the device in order to reestablish the white space connectivity. The user input option 906 "Enter position information" is selectable to allow a user to enter known position information in order to validate and/or reestablish white space connectivity. The user input option 908 "Disable white space access point" is selectable to allow a user to disable the white space access point, which may be desirable such as when space-based satellite navigation system (e.g. GPS) functionality is unavailable or the location is unknown.

Figure 10:
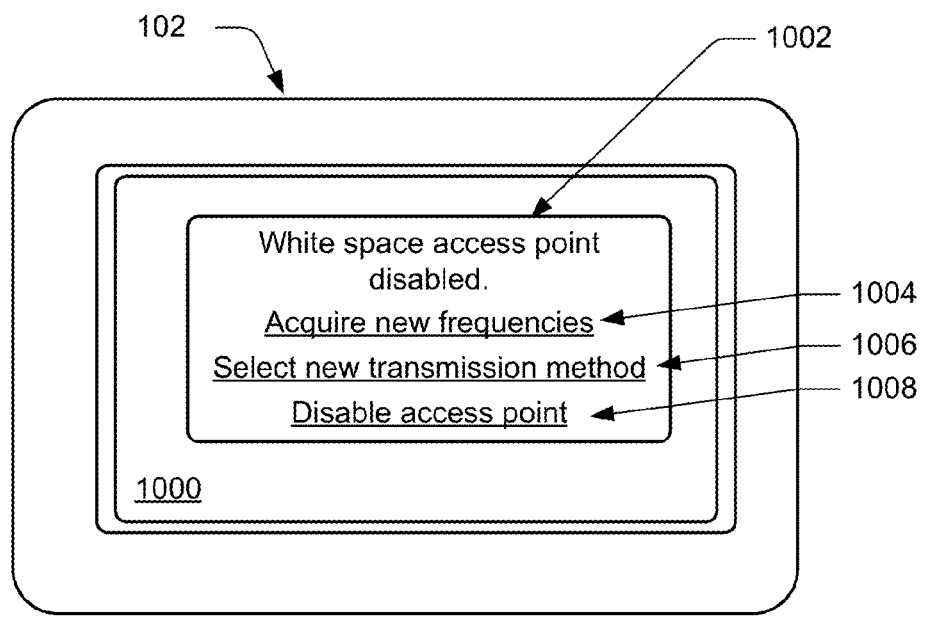
FIG. 10 illustrates an example graphical user interface that may be displayed by a computing device in accordance with one or more embodiments.

FIG. 10 illustrates GUI 1000 displaying message 1002. In this particular example, the message 1002 includes the message "White space access point disabled" and includes user input options 1004 "Acquire new frequencies," 1006 "Select new transmission method," and 1008 "Disable access point." The user input option 1004 "Acquire new frequencies" is selectable to allow a user to attempt to reestablish white space connectivity using an updated set of white space frequencies. The user input option 1006 "Select new transmission method" is selectable to allow the user to continue utilizing the device as an access point utilize alternative transmission methods such as WiFi. The user input option 1008 "Disable access point" is selectable to allow a user to disable utilization of the device as an access point altogether. It is to be appreciated and understood that while several different user options are shown, any number of options can be displayed. For example, the user interface 1000 or the message 1002 can be manipulable (e.g., pannable, scrollable, and so forth) to expose more options.

The implementation scenarios and GUIs described above are presented for purpose of example only, and it is to be appreciated that techniques discussed herein may be employed in a variety of other implementation scenarios and may utilize a variety of other GUIs not expressly depicted herein within the spirit and scope of the claimed implementations. Having discussed some example implementation scenarios, consider now some example procedures in accordance with one or more implementations.

Example Procedures

The following section describes some example procedures for wireless connectivity using white spaces in accordance with one or more implementations. The procedures, for instance, describe example ways of implementing various aspects of the example implementation scenarios described above. This is not to be construed as limiting, however, and the procedures may be employed in a variety of other implementation scenarios within the spirit and scope of the claimed implementations.

The procedures described herein may be used separately or in combination with each other, in whole or in part. These procedures are shown as sets of operations (or acts) performed, such as through one or more entities or modules, and are not necessarily limited to the order shown for performing the operation. The example procedures may be employed in the environment 100 of FIG. 1, the system 1600 of FIG. 16, and/or any other suitable environment. According to one or more implementations, the procedures describe example ways for performing various aspects of the example implementation scenarios described herein. In at least some implementations, steps described for the various procedures are implemented automatically and independent of user interaction.

Figure 11:
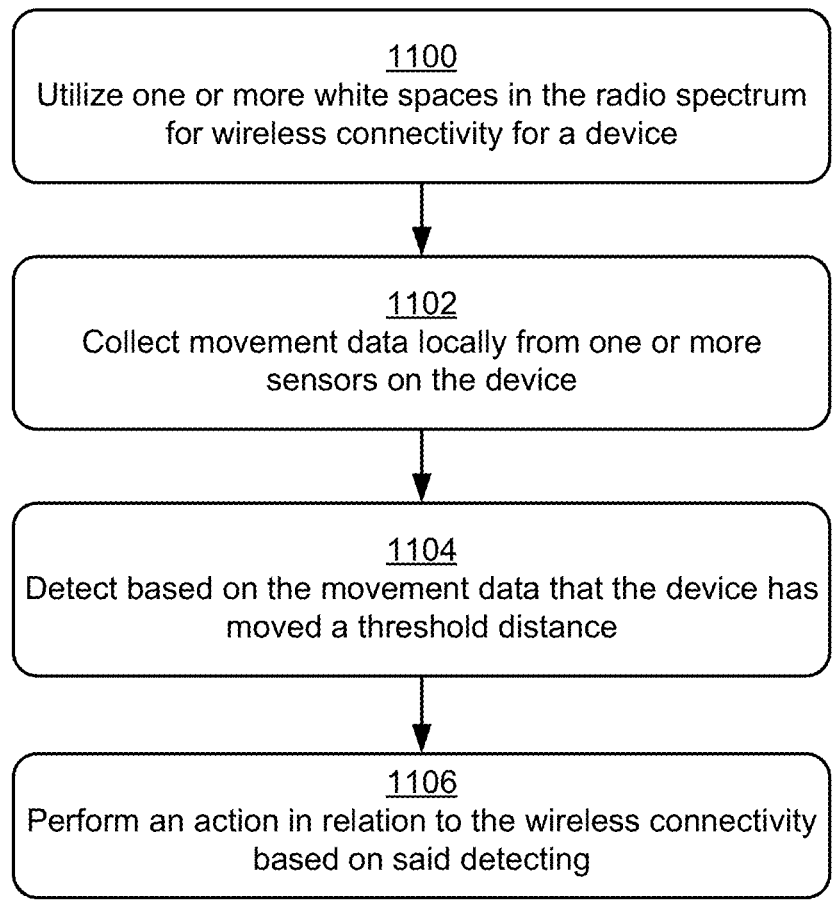
FIG. 11 is a flow diagram that describes steps in a method for performing an action in relation to wireless connectivity based on detecting that a device has moved a threshold distance in accordance with one or more embodiments.

FIG. 11 is a flow diagram that describes steps in a method for performing an action in relation to wireless connectivity based on detecting that a device has moved a threshold distance in accordance with one or more implementations.

Step 1100 utilizes one or more white spaces in the radio spectrum for wireless connectivity for a device. For example, a set of wireless channels is selected by the computing device 102 from the available channel database 126. The set of wireless channels may be selected based on various criteria, such as estimated bandwidth requirement, channel quality, combined channel bandwidth, and so forth.

For instance, the computing device 102 may query the channel database service 120 for wireless channels for performing wireless communication, such as voice communication, video communication, content sharing, and so forth. Based on attributes of the wireless communication (e.g., estimated bandwidth needed to exchange communication data), the computing device 102 selects a set of channels that can be combined to meet the needed bandwidth.

Alternatively or additionally, the set of channels may be selected by the channel database service 120 and communicated to the computing device 102. The set of wireless channels may include non-contiguous channels, e.g., channels that have at least one intervening RF region that is not included in the set of channels. Once the set of wireless channels is selected, the computing device 102 utilizes the selected channels for wireless connectivity, such as by utilizing the wireless module 104, the wireless hardware 106, and/or communication application 110. Utilization of the selected channels may include allowing the computing device 102 to act as a wireless access point for other devices to access the network 118. For instance, a different device may connect to the computing device 102 via a device-to-device connection such that the computing device 102 proxies network connectivity to the different device.

Step 1102 collects movement data locally from one or more sensors on the device. The collection may be performed by the movement detection hardware 114. For example, the movement detection hardware 114 may utilize an accelerometer, a gyroscope, and a compass to locally collect data regarding distance and direction of movement of the computing device 102. As referenced above, the movement detection hardware 114 may utilize any combination of a plurality of sensors to locally collect movement data. In some implementations, the collection of movement data is performed while location detection functionality is in an inactive state.

Step 1104 detects based on the movement data that the device has moved a threshold distance. For example, the movement module 116 may detect that based on the movement data, the computing device 102 has been physically displaced to a new location that is a distance equal to or greater than a threshold distance from an origin location. Alternatively, the movement module 116 may estimate that based on the movement data, the computing device 102 has moved an aggregate distance that is greater than or equal to the threshold distance, and may have been displaced a distance equal to or greater than the threshold distance from the origin location. In yet another example, the movement mode 116 may detect that based on the movement data, the computing device 102 is approaching the threshold distance, e.g., is within a specified distance of the threshold distance. As referenced above with respect to FIG. 1, the movement module 116 may utilize any combination of a plurality of techniques to detect movement of the computing device 102. In some implementations, detecting based on the movement that the device moves a threshold distance includes determining that the movement data indicates that the device may have moved the threshold distance, and responsive to the determining, verifying the location of the device based on a remote source. In some implementations, the detecting is performed while location detection functionality is in an inactive state.

Step 1106 performs an action in relation to the wireless connectivity based on said detecting. In one example action, the computing device 102 may cease utilization of the white spaces for wireless connectivity. In an alternate or additional action, the computing device 102 may obtain and utilize one or more different white spaces for wireless connectivity. For example, the computing device 102 may query the channel database service 120 for available channels, and begin utilizing a new channel set associated with the current location of the computing device 102.

For instance, a new channel set may be selected based on various criteria. As an example, one or more channels communicated in a previous set of wireless channels may no longer be available and/or may be determined to have insufficient signal quality to be used for wireless communication. As another example, the channel database service 120 may communicate updated channels to the computing device 102, which then updates the available channel database 126. In at least some implementations, the new channel set may include different channels, a different number of channels, different channel types (e.g., channel bandwidths), and so forth. Alternately or additionally, the computing device 102 may receive permissions from the channel database service 120 to continue utilizing the one or more white spaces that are current being utilized by the computing device 102, such as in step 1100.

In another alternate or additional action, the computing device 102 may perform step 1112 and utilize one or more alternative or additional methods for wireless connectivity. For example, the computing device 102 may utilize 3G, Bluetooth, WiFi™ and/or other techniques or protocols for wireless connectivity.

In yet another alternate or additional action, the computing device 102 may present a user notification in connection with step 1106, such as before or after performing one or more of the example actions discussed above. Example user notifications are detailed above with respect to FIGS. 7-10. In some implementations, the user notification may be presented for a specified duration (e.g., n seconds), may be presented until viewed by a user, may be presented until user input is received, and so forth.

Figure 12:
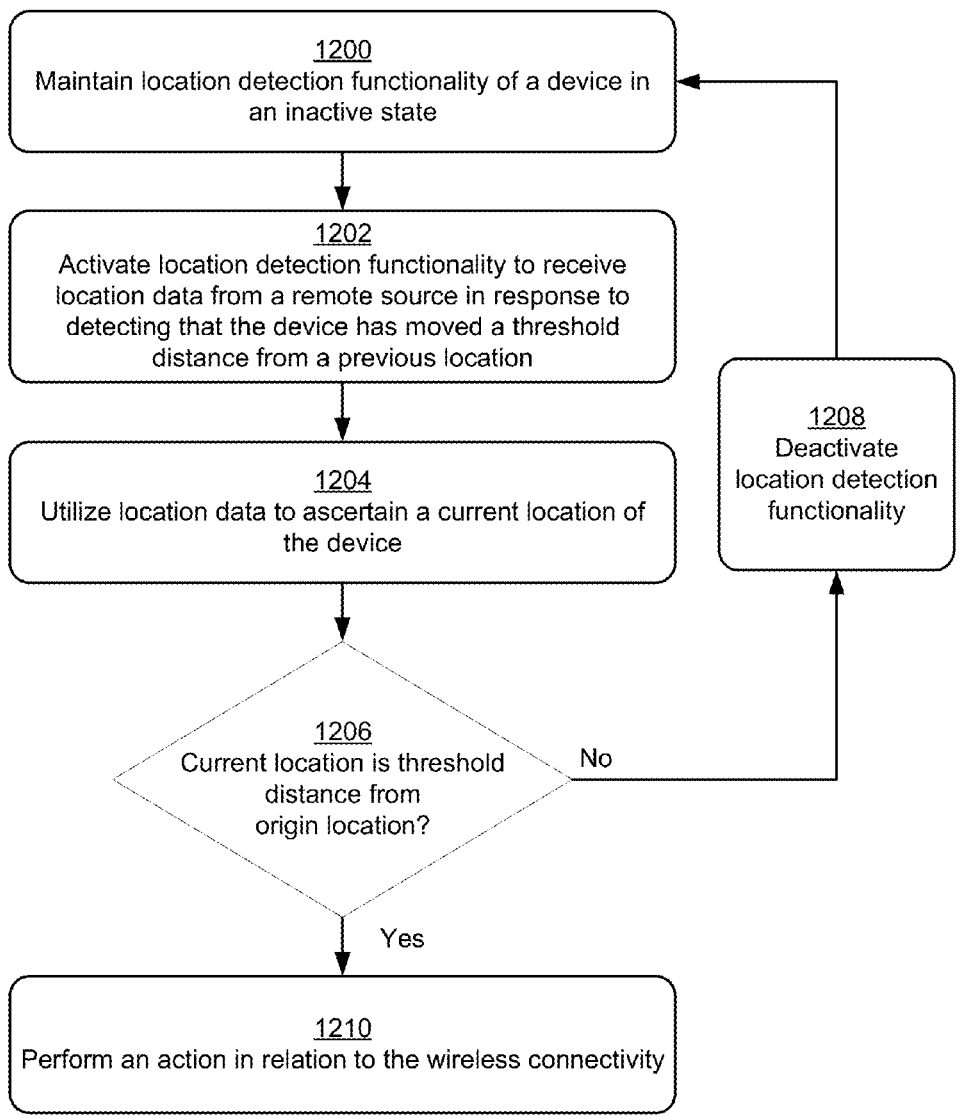
FIG. 12 is a flow diagram that describes steps in a method for performing an action in relation to wireless connectivity based on whether a device is located beyond a threshold distance in accordance with one or more embodiments.

FIG. 12 is a flow diagram that describes steps in a method for performing an action in relation to wireless connectivity based on a device being located beyond a threshold distance in accordance with one or more implementations. The method, for instance, describes an example variation and/or extension of the method described above with reference to FIG. 11, such as an example action that is taken at step 1106.

Step 1200 maintains a location detection functionality of a device in an inactive state. For example, the computing device 102 may maintain the geographical position module 112 in an inactive (e.g., powered off) state. As described above with reference to FIG. 1, geographic position module 112 may utilize any number of techniques, such as a space-based satellite navigation system (e.g. GPS).

Step 1202 activates the location detection functionality to receive location data from a remote source in response to detecting that the device has moved a threshold distance from a previous location. For example, the computing device 102 may activate the geographical position module 112 to receive location data from a remote source, such as GPS data. Said detecting may be, for example, similar to that described in step 1104 of FIG. 11.

Step 1204 utilizes the location data to ascertain a current location of the device. For example, the computing device 102 may utilize GPS data to ascertain a current location of the device.

Step 1206 determines whether the computing device 102 is located at a current location that is at least a threshold distance from an origin location. If the computing device 102 is not located at least a threshold distance from the origin location ("No"), step 1208 deactivates the location detection functionality. For example, the computing device 102 may deactivate the geographical position module 112. If the client is located at least a threshold distance from the origin location ("Yes"), step 1210 performs an action in relation to the wireless activity. For example, the computing device 102 may cease utilization of the white spaces for wireless connectivity. The action may be, for example, any of those referenced above with respect to step 1106 of FIG. 11.

Figure 13:
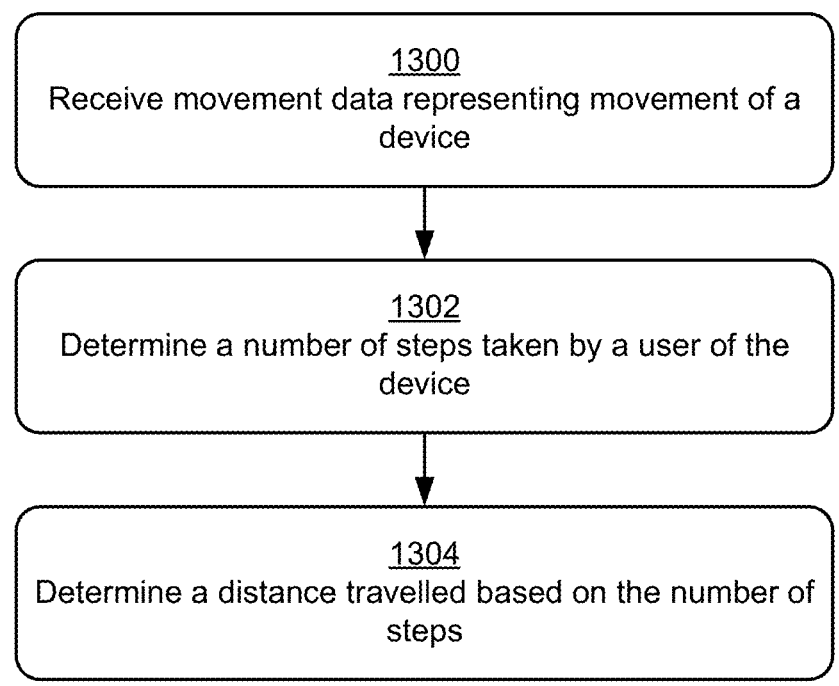
FIG. 13 is a flow diagram that describes steps in a method for estimating a distance travelled in accordance with one or more embodiments.

FIG. 13 is a flow diagram that describes steps in a method for determining a distance travelled in accordance with one or more implementations. The method, for instance, describes an example variation and/or extension of the method described above with reference to FIG. 11, such as an example detection that is taken at step 1104.

Step 1300 receives movement data representing movement of a device. For example, the movement module 116 may receive movement data from the movement detection hardware 114, such as data collected by an accelerometer and/or a gyroscope. In this implementation, the movement data includes data representing distance but not data representing direction of movement.

Step 1302 determines a number of steps taken by a user of the device. For example, the movement module 116 may be able to interpret movement data from an accelerometer and/or a gyroscope as describing a number of steps taken by a user of the computing device 102.

Step 1304 determines a distance travelled based on the determined number of steps. In some implementations, the movement module 116 may multiply the number of steps by a distance of an average step. The distance of an average step may be any number. In some implementations, the distance of an average step may be a predetermined number, for example, 0.5 meters, n meters, and so forth. Alternatively, the distance of an average step may be based on a user input.

Figure 14:
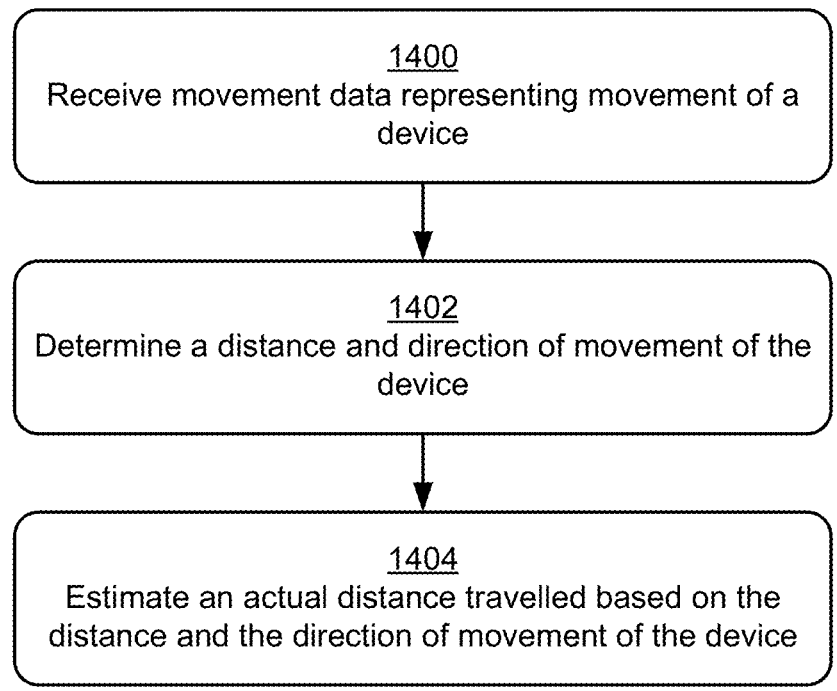
FIG. 14 is a flow diagram that describes steps in a method for estimating an actual distance travelled in accordance with one or more embodiments.

FIG. 14 is a flow diagram that describes steps in a method for estimating an actual distance travelled in accordance with one or more implementations. The method, for instance, describes an example variation and/or extension of the method described above with reference to FIG. 11, such as an example detection that is taken at step 1104.

Step 1400 receives movement data representing movement of a device. For example, the movement module 116 may receive movement data from the movement detection hardware 114, such as data collected by an accelerometer and/or a gyroscope. In this implementation, the movement data includes data representing distance as well as data representing direction.

Step 1402 determines a distance and direction of movement of the device. For example, the movement module 116 may be able to interpret movement data from an accelerometer and/or a gyroscope as describing a distance of movement of the computing device 102. Further, the movement module 116 may be able to interpret movement data from a compass as describing a direction of travel of the device corresponding in time the data describing the distance of movement.

Step 1404 estimates an actual distance travelled based on the distance and the direction of movement. For example, the movement module 116 may be able to determine a device movement vector based on the distance and direction of movement over a plurality of time intervals.

Figure 15:
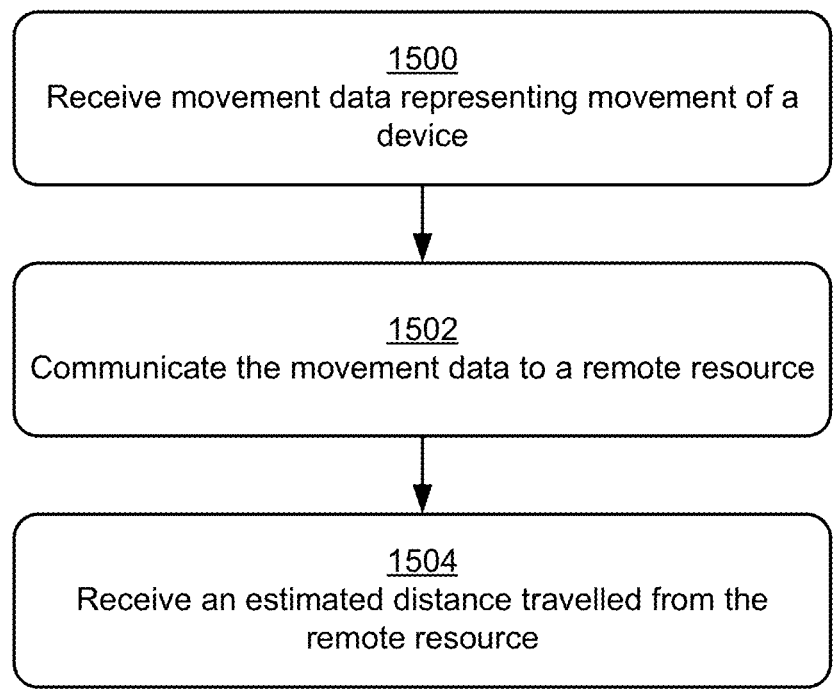
FIG. 15 is a flow diagram that describes steps in a method for determining an estimated distance travelled in accordance with one or more embodiments.

FIG. 15 is a flow diagram that describes steps in a method for determining an estimated distance travelled in accordance with one or more implementations. The method, for instance, describes an example variation and/or extension of the method described above with reference to FIG. 11, such as an example detection that is taken at step 1104.

Step 1500 receives movement data representing movement of a device. For example, the movement module 116 may receive movement data from the movement detection hardware 114, such as data collected by an accelerometer, a gyroscope, and a compass.

Step 1502 communicates the movement data to a remote resource. The remote resource may be, for example, a server, a cloud network, or another device.

Step 1504 receives an estimated distance travelled from the remote resource. For example, the computing device 102 may receive an indication from the remote resource that the computing device 102 has moved n meters, has moved n meters in a particular direction, is located at particular coordinates, or any other indication of location or distance.

Having discussed some example procedures, consider now a discussion of an example system and device in accordance with one or more implementations.

Example System and Device

Figure 16:
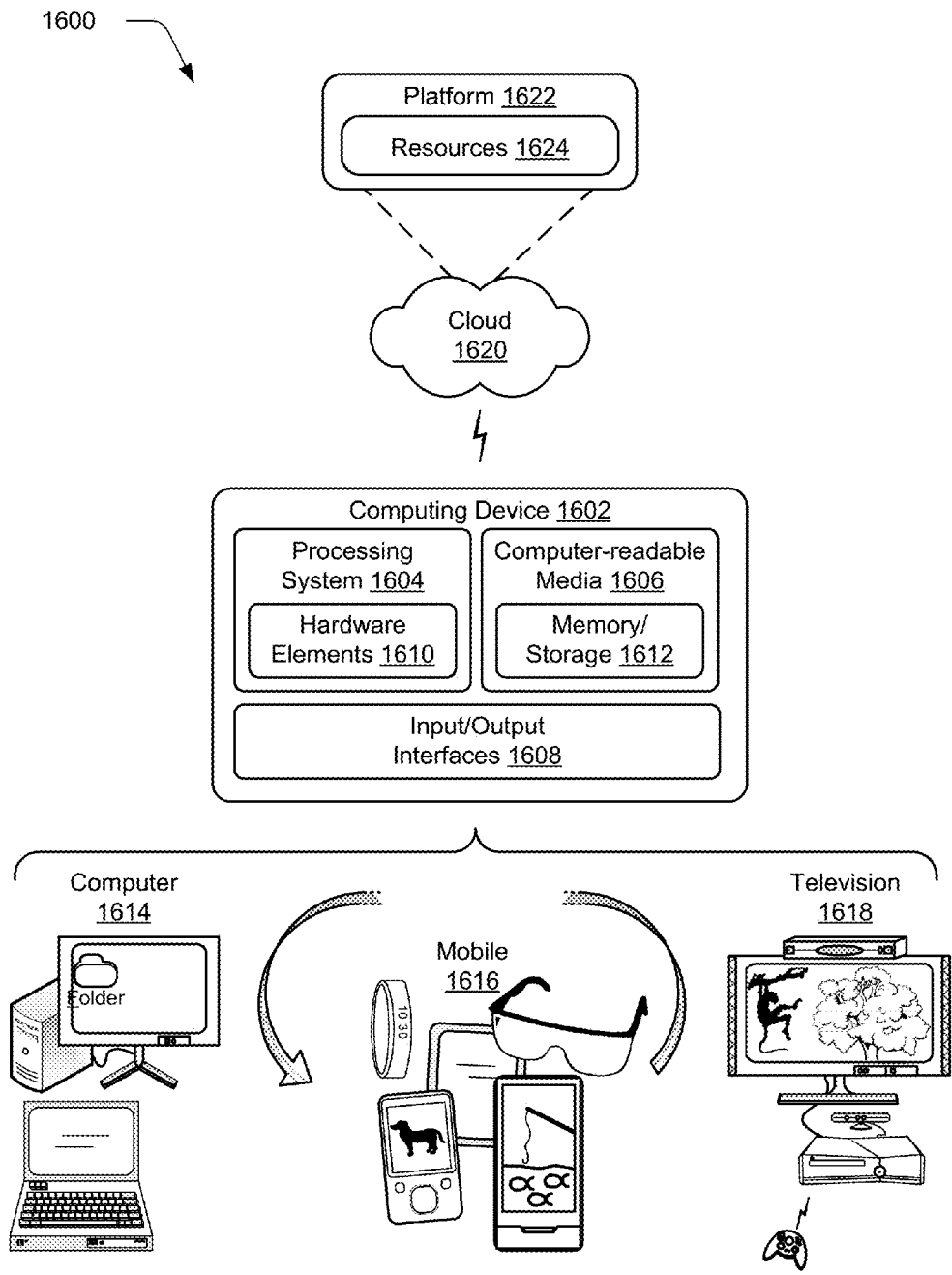
FIG. 16 illustrates an example system and computing device as described with reference to FIG. 1, which are configured to implement embodiments of techniques described herein.

FIG. 16 illustrates an example system generally at 1600 that includes an example computing device 1602 that is representative of one or more computing systems and/or devices that may implement various techniques described herein. For example, the computing device 102 discussed above with reference to FIG. 1 can be embodied as the computing device 1602. The computing device 1602 may be, for example, a server of a service provider, a device associated with the client (e.g., a client device), an on-chip system, and/or any other suitable computing device or computing system.

The example computing device 1602 as illustrated includes a processing system 1604, one or more computer-readable media 1606, and one or more I/O Interfaces 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1606 is illustrated as including memory/storage 1612. The memory/storage 1612 represents memory/storage capacity associated with one or more computer-readable media. The memory/storage 1612 may include volatile media (such as random access memory (RAM)) and/or nonvolatile media (such as read only memory (ROM), Flash memory, optical disks, magnetic disks, and so forth). The memory/storage 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system. The instructions and/or functions may be executable/operable by one or more articles of manufacture (for example, one or more computing devices 1602 and/or processing systems 1604) to implement techniques, modules, and examples described herein.

As further illustrated in FIG. 16, the example system 1600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1602 may assume a variety of different configurations, such as for computer 1614, mobile 1616, and television 1618 uses. Each of these configurations includes devices that may have generally different constructs and capabilities, and thus the computing device 1602 may be configured according to one or more of the different device classes. For instance, the computing device 1602 may be implemented as the computer 1614 class of a device that includes a personal computer, desktop computer, a multi-screen computer, laptop computer, netbook, and so on.

The computing device 1602 may also be implemented as the mobile 1616 class of device that includes mobile devices, such as a mobile phone, portable music player, a wearable device, a portable gaming device, a tablet computer, a multi-screen computer, and so on. The computing device 1602 may also be implemented as the television 1618 class of device that includes devices having or connected to generally larger screens in casual viewing environments. These devices include televisions, set-top boxes, gaming consoles, and so on.

The techniques described herein may be supported by these various configurations of the computing device 1602 and are not limited to the specific examples of the techniques described herein. For example, functionalities discussed with reference to the computing device 102 and/or the channel database service 120 may be implemented all or in part through use of a distributed system, such as over a "cloud" 1620 via a platform 1622 as described below.

The cloud 1620 includes and/or is representative of a platform 1622 for resources 1624. The platform 1622 abstracts underlying functionality of hardware (e.g., servers) and software resources of the cloud 1620. The resources 1624 may include applications and/or data that can be utilized while computer processing is executed on servers that are remote from the computing device 1602. Resources 1624 can also include services provided over the Internet and/or through a subscriber network, such as a cellular or WiFi® network.

The platform 1622 may abstract resources and functions to connect the computing device 1602 with other computing devices. The platform 1622 may also serve to abstract scaling of resources to provide a corresponding level of scale to encountered demand for the resources 1624 that are implemented via the platform 1622. Accordingly, in an interconnected device embodiment, implementation of functionality described herein may be distributed throughout the system 1600. For example, the functionality may be implemented in part on the computing device 1602 as well as via the platform 1622 that abstracts the functionality of the cloud 1620.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

EXAMPLE 1

A device comprising: one or more processors; and one or more computer-readable media storing processor-executable instructions that, responsive to execution by the one or more processors, cause the device to perform operations including: utilizing one or more white spaces in the radio spectrum for wireless connectivity for a device; collecting movement data locally from one or more sensors on the device; detecting based on the movement data that the device moves a threshold distance; and performing an action in relation to the wireless connectivity based on said detecting.

EXAMPLE 2

The device as described in example 1, wherein said utilizing one or more white spaces in the radio spectrum for wireless connectivity for a device comprises acting as a wireless access point for one or more other devices to connect to a network.

EXAMPLE 3

The device as described in one or more of examples 1 or 2, wherein said one or more sensors on the device comprise an accelerometer or a gyroscope.

EXAMPLE 4

The device as described in one or more of examples 1-3, wherein said one or more sensors on the device comprise an accelerometer or a gyroscope, and said collecting movement data locally comprises utilizing the accelerometer or the gyroscope to determine a number of steps taken by a user of the device.

EXAMPLE 5

The device as described in one or more of examples 1-4, wherein said one or more sensors on the device comprise an accelerometer, a gyroscope, and a compass, and said collecting movement data locally comprises utilizing the accelerometer, the gyroscope, and the compass to determine a number and a direction of steps taken by a user of the device.

EXAMPLE 6

The device as described in one or more of examples 1-5, wherein said performing an action in relation to the wireless connectivity comprises one or more of: stopping utilizing the one or more white spaces; utilizing one or more different white spaces; submitting a request for a white space allocation for wireless connectivity for the device; or utilizing one or more alternative methods for wireless connectivity.

EXAMPLE 7

The device as described in one or more of examples 1-6, wherein said detecting based on the movement that the device moves a threshold distance comprises: determining that the movement data indicates that the device may have moved the threshold distance; and responsive to said determining, verifying a location of the device based on a remote source.

EXAMPLE 8

The device as described in one or more of examples 1-7, wherein said detecting based on the movement that the device moves a threshold distance comprises: determining that the movement data indicates that the device may have moved the threshold distance; and responsive to said determining, verifying a location of the device based on a remote source, the remote source comprising a space-based satellite navigation system functionality.

EXAMPLE 9

The device as described in one or more of examples 1-8, wherein said detecting based on the movement that the device moves a threshold distance comprises: determining that the movement data indicates that the device may have moved the threshold distance; responsive to said determining, verifying a location of the device based on a remote source, the remote source comprising a space-based satellite navigation system functionality; and responsive to said verifying, deactivating the space-based satellite navigation system functionality of the device.

EXAMPLE 10

The device as described in one or more of examples 1-9, the operations further comprising: presenting a graphical user interface that indicates that the device has moved the threshold distance.

EXAMPLE 11

A computer-implemented method comprising: utilizing one or more white spaces in the radio spectrum for wireless connectivity for a device; collecting movement data locally from one or more sensors on the device; detecting based on the movement data that the device moves a threshold distance; and performing an action in relation to the wireless connectivity based on said detecting, including presenting a user notification.

EXAMPLE 12

The computer-implemented method as described in example 11, wherein said user notification is presented in a graphical user interface of the device.

EXAMPLE 13

The computer-implemented method as described in one or more of examples 11 or 12, wherein said user notification is presented in a graphical user interface of the device; and said user notification comprises a message indicating that the device is performing the action.

EXAMPLE 14

The computer-implemented method as described in one or more of examples 11-13, wherein said user notification is presented in a graphical user interface of the device; and said user notification comprises a request for input relating to the action.

EXAMPLE 15

The computer-implemented method as described in one or more of examples 11-14, wherein said performing an action in relation to the wireless connectivity comprises one or more of: stopping utilizing the one or more white spaces; utilizing one or more different white spaces; submitting a request for a white space allocation for wireless connectivity for the device; or utilizing one or more alternative methods for wireless connectivity.

EXAMPLE 16

The computer-implemented method as described in one or more of examples 11-15, wherein said detecting based on the movement that the device moves a threshold distance comprises: determining that the movement data indicates that the device may have moved the threshold distance, and; responsive to said determining, verifying a location of the device based on a remote source.

EXAMPLE 17

The computer-implemented method as described in one or more of examples 11-16, wherein said detecting based on the movement that the device moves a threshold distance comprises: determining that the movement data indicates that the device may have moved the threshold distance; responsive to said determining, verifying a location of the device based on a remote source, the remote source comprising a space-based satellite navigation system functionality; and responsive to said verifying, deactivating the space-based satellite navigation system functionality of the device.

EXAMPLE 18

A computer-implemented method comprising: utilizing one or more white spaces in the radio spectrum for wireless connectivity for a device; collecting movement data locally from one or more sensors on the device; detecting based on the movement data that the device moves a threshold distance; and performing an action in relation to the wireless connectivity based on said detecting, including activating a location detection functionality of the device configured to receive location data from a remote source.

EXAMPLE 19

The method as described example 18, wherein said utilizing one or more white spaces in the radio spectrum for wireless connectivity for a device comprises acting as an access point for one or more other devices to connect to a network via the one or more white spaces.

EXAMPLE 20

The method as described one or more of examples 18 or 19, wherein: said utilizing one or more white spaces in the radio spectrum for wireless connectivity for a device comprises acting as an access point for one or more other devices to connect to a network via the one or more white spaces; and said collecting and said detecting are performed while the location detection functionality is in an inactive state.

CONCLUSION

Techniques for using local sensors to maintain a whitespace access point are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A device comprising:
   one or more processors; and
   one or more computer-readable storage media storing processor-executable instructions that, responsive to execution by the one or more processors, cause the device to perform operations including:
   utilizing one or more white spaces in the radio spectrum for wireless connectivity for a device;
   collecting movement data locally from one or more sensors on the device;
   detecting based on the movement data that the device moves a threshold distance, said detecting including determining that the movement data indicates that the device may have moved the threshold distance and responsive to said determining, verifying a location of the device based on a remote source; and
   performing an action in relation to the wireless connectivity based on said detecting, the action comprising one or more of:
   stopping utilizing the one or more white spaces;
   utilizing one or more different white spaces;
   submitting a request for a white space allocation for wireless connectivity for the device; or
   utilizing one or more alternative methods for wireless connectivity.

2. The device as described in claim 1, wherein said utilizing one or more white spaces in the radio spectrum for wireless connectivity for a device comprises acting as a wireless access point for one or more other devices to connect to a network.

3. The device as described in claim 1, wherein said one or more sensors on the device comprise an accelerometer or a gyroscope.

4. The device as described in claim 1, wherein said one or more sensors on the device comprise an accelerometer or a gyroscope, and said collecting movement data locally comprises utilizing the accelerometer or the gyroscope to determine a number of steps taken by a user of the device.

5. The device as described in claim 1, wherein said one or more sensors on the device comprise an accelerometer, a gyroscope, and a compass, and said collecting movement data locally comprises utilizing the accelerometer, the gyroscope, and the compass to determine a number and a direction of steps taken by a user of the device.

6. The device as described in claim 1, wherein the remote source comprises a space-based satellite navigation system functionality.

7. The device as described in claim 1, wherein the remote source comprises a space-based satellite navigation system functionality and said detecting based on the movement that the device moves a threshold distance further comprises:
   responsive to said verifying, deactivating the space-based satellite navigation system functionality of the device.

8. The device as described in claim 1, the operations further comprising:
   presenting a graphical user interface that indicates that the device has moved the threshold distance.

9. The device as described in claim 1, wherein said verifying a location of the device based on a remote source comprises utilizing a location detection functionality, and said collecting and determining are performed while the location detection functionality is in an inactive state.

10. A computer-implemented method comprising:
utilizing, by a device, one or more white spaces in the radio spectrum for wireless connectivity for the device;
collecting, by the device, movement data locally from one or more sensors on the device;
detecting based on the movement data that the device moves a threshold distance, said detecting including determining that the movement data indicates that the device may have moved the threshold distance and responsive to said determining, verifying a location of the device based on a remote source; and
performing, by the device, an action in relation to the wireless connectivity based on said detecting, including one or more of:
stopping utilizing the one or more white spaces;
utilizing one or more different white spaces;
submitting a request for a white space allocation for wireless connectivity for the device, or
utilizing one or more alternative methods for wireless connectivity.

11. The computer-implemented method as described in claim 10, wherein said performing further comprises presenting a user notification in a graphical user interface of the device.

12. The computer-implemented method as described in claim 10, wherein said performing further comprises presenting a user notification in a graphical user interface of the device; and
said user notification comprises a message indicating that the device is performing the action.

13. The computer-implemented method as described in claim 10, wherein said performing further comprises presenting a user notification in a graphical user interface of the device; and said user notification comprises a request for input relating to the action.

14. The computer-implemented method as described in claim 10, wherein
the remote source comprises a space-based satellite navigation system functionality; and
responsive to said verifying, deactivating the space-based satellite navigation system functionality of the device.

15. The computer-implemented method as described in claim 10, wherein said utilizing one or more white spaces in the radio spectrum for wireless connectivity for a device comprises acting as a wireless access point for one or more other devices to connect to a network.

16. A computer-implemented method comprising:
utilizing one or more white spaces in the radio spectrum for wireless connectivity for a device including acting as an access point for one or more other devices to connect to a network via the one or more white spaces;
collecting movement data locally from one or more sensors on the device while a location detection functionality is in an inactive state;
detecting based on the movement data that the device moves a threshold distance while the location detection functionality is in an inactive state; and
performing an action in relation to the wireless connectivity based on said detecting, including activating the location detection functionality of the device configured to receive location data from a remote source, the location detection functionality different than the one or more sensors.

17. The method as described in claim 16, wherein said performing an action in relation to the wireless connectivity further comprises presenting a user notification in a graphical user interface of the device.

18. The method as described in claim 16, wherein said one or more sensors on the device comprise one or more of an accelerometer or a gyroscope, and said collecting movement data locally comprises utilizing one or more of the accelerometer or the gyroscope to estimate a number of steps taken by a user of the device.

19. The method as described in claim 16, wherein the remote source comprises a space-based satellite navigation system functionality.

20. The method as described in claim 16, further comprising responsive to receiving location data from the remote source, deactivating the location detection functionality.

* * * * *